July 1, 1969

T. B. FRYER 3,453,546

TELEMETER ADAPTABLE FOR IMPLANTING IN AN ANIMAL

Filed Nov. 4, 1966

INVENTOR.
THOMAS B. FRYER
BY
ATTORNEYS

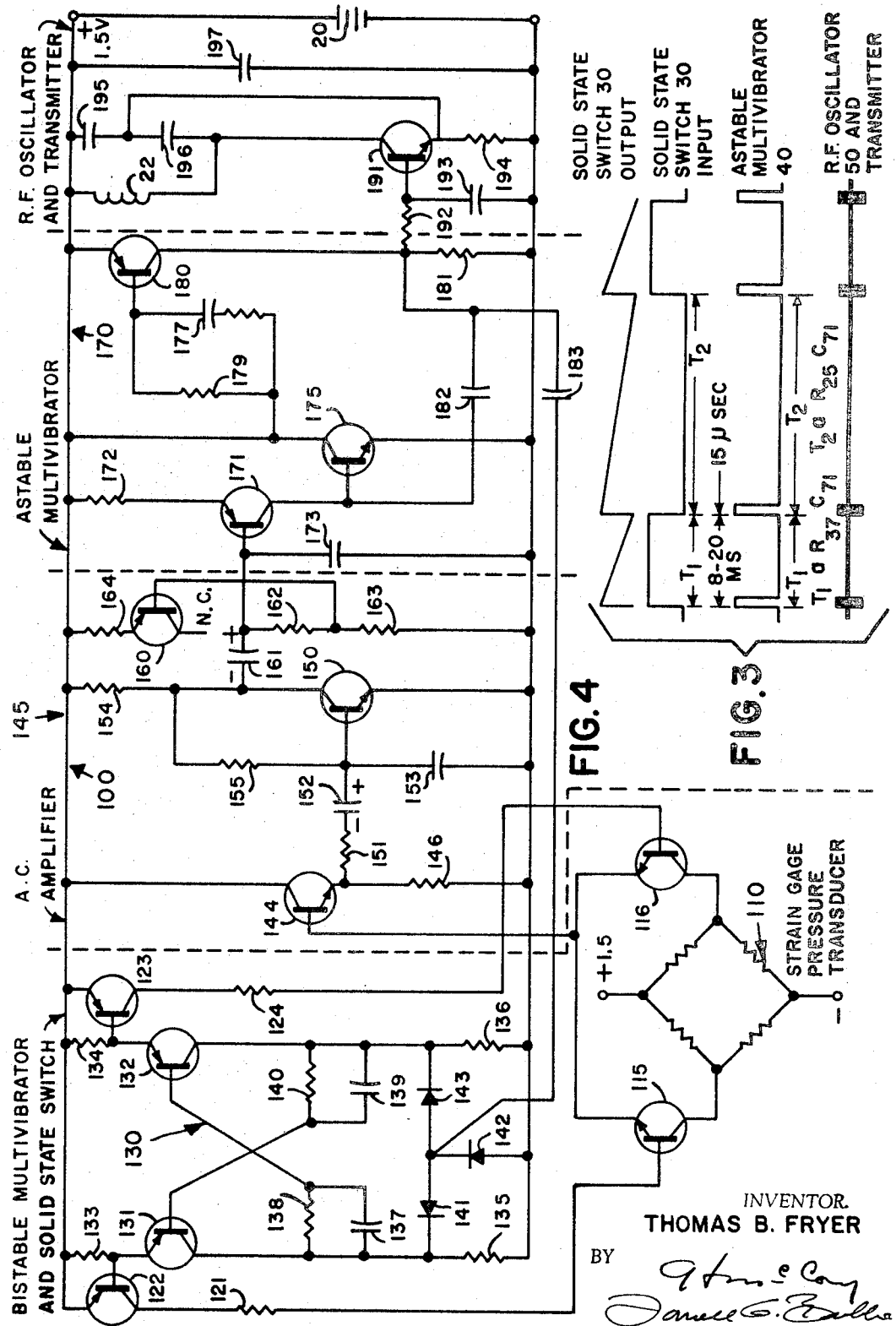

United States Patent Office 3,453,546
Patented July 1, 1969

3,453,546
TELEMETER ADAPTABLE FOR IMPLANTING IN AN ANIMAL
Thomas B. Fryer, Cupertino, Calif., assignor to the United States of America as represented by the Administrator of the National Aeronautics and Space Administration
Filed Nov. 4, 1966, Ser. No. 592,694
Int. Cl. H04b 1/04; G01k 5/18, 5/52
U.S. Cl. 325—143     10 Claims

ABSTRACT OF THE DISCLOSURE

A telemeter for biomedical instrumentation in which two voltages are generated. The ratio of the voltages is proportional to the condition monitored. These voltages are alternately sampled, and equal-duration bursts of R-F energy are transmitted. The intervals between the successive bursts are alternately $T_1$ and $T_2$. The ratio of $T_1$ to $T_2$ is equal to the ratio of the two voltages. Since the condition monitored is a function of the ratio, errors caused by power supply fluctuations, etc. are cancelled.

---

The invention described herein was made by an employee of the United States Government and may be manufactured and used by or for the Government for governmental purposes without the payment of any royalties thereon or therefor.

The present invention relates in general to a telemeter, and more particularly to a telemeter adaptable for implanting in an animal.

Heretofore, telemeters suitable in size to be implanted in small animals had failed to meet the requirements of accuracy and low power consumption. Those telemeters capable of meeting the accuracy and power consumption requirements were too large for implanting in small animals.

Accordingly, an object of the present invention is to provide a telemeter that is small enough for implanting in an animal without sacrificing accuracy and without requiring a high quantity of electrical power.

Another object of the present invention is to provide a miniature, micro power telemeter that is accurate.

Another object of the present invention is to provide a telemeter that is small enough for implanting in an animal, and yet will measure temperature accurately while consuming only microwatts of power.

Another object of the present invention is to provide a telemeter that is small enough for implanting in an animal, and yet will measure pressure accurately while consuming only microwatts of power.

Another object of the present invention is to provide an improved telemeter for implanting in an animal.

Other and further objects and advantages of the present invention will be apparent to one skilled in the art from the following description taken in conjunction with the accompanying drawings, in which:

FIG. 3 is a diagrammatic illustration of waveforms of electrical signals appearing in various stages of the electronic circuit illustrated in FIG. 2.

FIG. 4 is a diagrammatic illustration of an electronic circuit, which is a modification of the electronic circuit shown in FIG. 2, to render the telemeter of FIG. 1 suitable for use in measuring pressure.

Figure 1:
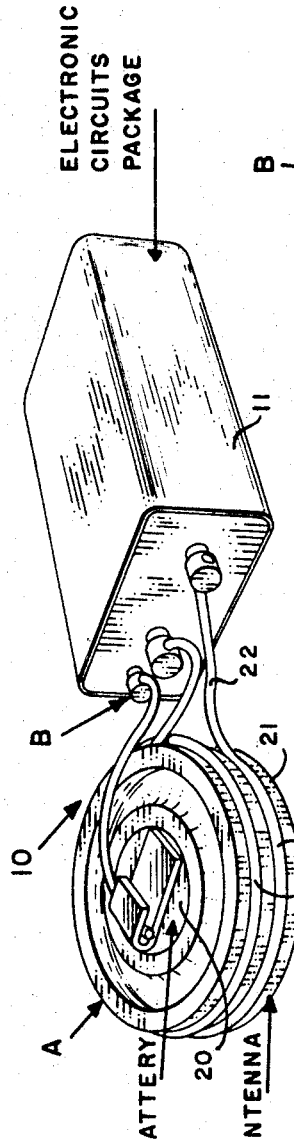
FIG. 1 is a perspective view of the telemeter of the present invention adaptable for use in measuring temperature.

Illustrated FIG. 1 is the miniature, micropowered telemeter 10 of the present invention, which is adapted for implanting in an animal for sensing the temperature of the animal, for measuring the temperature of the animal, and for transmitting by telemetry the measured data. The telemeter 10 comprises an antenna-battery A and an electronic circuit B encased in a package 11. The electronic circuit B is an integrated circuit formed from a monolithic structure encapsulated with the sealed package 11. Any suitable seal may be employed such as an epoxy or wax. It has been found that, in the preferred embodiment, the telemeter 10 operates in an improved manner when a glass seal is employed, which provides an hermetically sealed package.

According to the present invention, the antenna-battery A comprises a battery 20, which in the exemplary embodiment, is a Mallory RM312 or RM475 one cell battery and encompassing the battery 20 is a ferrite core 21. The ferrite core 21 has a cylindrical configuration for surrounding the battery 20 in tight fitting relation and serves as an antenna for the telemeter 10 in conjunction with an R.F. coil 22. The R.F. coil 22 is helically wound around the ferrite core 21. The ferrite core 21 may be employed as a holder for the battery 20.

Figure 2:
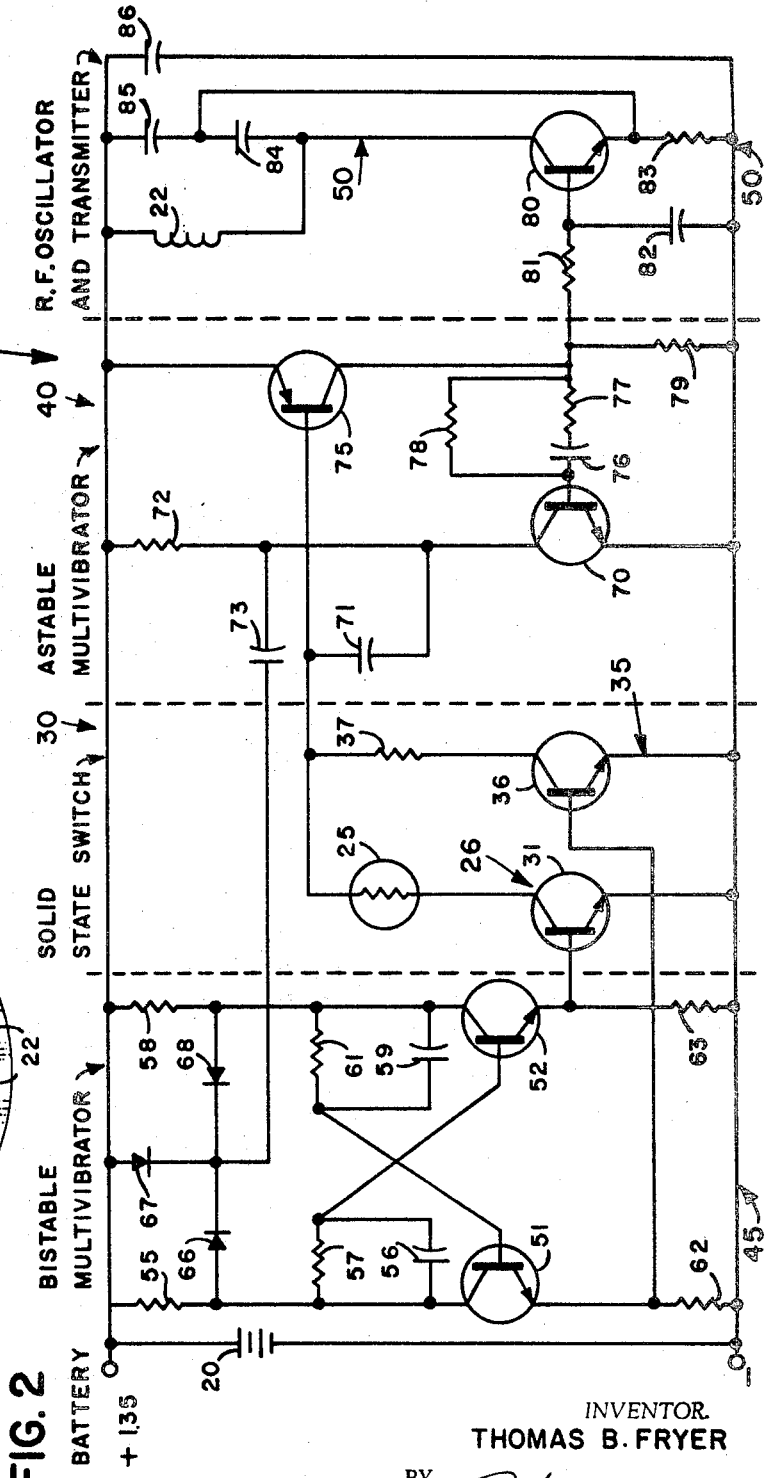
FIG. 2 is a diagrammatic illustration of an electronic circuit employed in the telemeter shown in FIG. 2.

In FIG. 2, there is shown the electronic circuit B, the R.F. coil 22 and the battery 20. All of the circuits shown in FIG. 2 are integrated and encapsulated within the sealed package 11, excepting the battery 20 and the R.F. coil 22. If desired, the temperature sensor may be kept out of the package 11 to achieve a precise temperature spot location. In this manner, temperature compensations for the electronic circuit is still obtained and yet the temperature sensor can be precisely located.

By sealing the electronic circuit B in the package 11 and separating the same from the antenna-battery A, the electronic components of the circuit are protected against body fluids, when the telemeter 10 is implanted within an animal. Further, the separation of the antenna-battery A from the package 11 obviates the danger of the rupture of the sealed package 11 by battery outgassing. The antenna-battery A is less susceptible to damage by the body fluids due to its low impedance and may be sufficiently protected by wax.

By virtue of the ferrite core 21 serving as an antenna for the telemeter 10 in conjunction with the R.F. coil 22, the ferrite core 21 concentrates the R.F. field and reduces induction effects in the battery 20. In addition thereto, the ferite core 22 provides a more stable oscillation frequency. Thus, the ferrite core 22 improves the efficiency of the antenna for the telemeter 10.

The R.F. coil 22, in the exemplary embodiment, is in the form of an air core coil. Through the use of the ferrite core 21 in conjunction with the R.F. coil 22, a more miniaturized antenna has been achieved. Furthermore, an air core coil at 100 megacycles has a tendency to shift 1 to 2 megacycles in frequency when the telemeter 10 is implanted in an animal. With the ferrite core used in conjunction with the air core coil, the frequency shift in an antenna is reduced to seceral hundred kilocycles. In the preferred embodiment, the output frequency of the telemeter 10 is over a carrier operation R.F. range from 10 to 120 megacycles.

For sensing the temperature of the animal in which the telemeter 10 is implanted, a conventional thermosensor, such as a thermistor 25, is incorporated as part of the electronic circuit B and, in the preferred embodiment, is encapsulated within the package 11. If desired, the thermistor 25 may be disposed outside of the package 11 to achieve a precise spot reading. The resistance of the thermistor 25 varies inversely with the temperature of the animal in which the telemeter 10 is implanted.

As shown in FIG. 2, the thermistor 25 is in the output circuit of a conventional transistor switching circuit 26 of a solid state switch 30. More particularly, the thermistor 25 constitutes the load resistance of a transistor 31 in the switching circuit 26. The solid state switch 30 also includes a switching circuit 35 having a transistor 36 therein. A reference or standard resistor 37 constitutes the load resistance for the transistor 36. The resistor 37 is a precision type resistor of a fixed resistance value. Current will flow through the thermistor 25 when the transistor 26 conducts and current will flow through the resistor 37 when the transistor 36 conducts.

A conventional astable multivibrator 40 has its input circuit connected to the output of the solid state switch 30, and a conventional bistable multivibrator 45 has its output connected to the input of the solid state switch 30. The bistable multivibrator 45 causes the alternate conduction of the transistor 31 and the transistor 36 and thereby causes current to flow alternately through the thermistor 25 and the reference resistor 37 for controlling the operation of the astable multivibrator 40. In turn, the astable multivibrator 40 controls the operation of a conventional Colpitts R.F. oscillator 50 to produce a pulse time code modulated signal for transmission by the telemeter 10.

As previously described, current flows alternately through the thermistor 25 and the resistor 37. Therefore, the thermistor 25 and the resistor 37 alternately control the successive periods between series of pulses of the pulse time modulated signal (FIG. 3). Hence, the precision reference resistor 37 enables the accurate determination of the unknown resistance of the thermistor 25, whereby a comparison may be made between successive periods defined by the series of pulses for arriving at the body temperature of the animal in which the telemeter 10 is implanted.

Toward this end, the conventional bistable multivibrator 45 is employed for squareware generation and comprises transistors 51 and 52. The transistors 51 and 52 will conduct alternately. When the transistor 51 is turning "on," its collector potential through the collector resistor 55 decreases and a negative going pulse is transmitted to the base of the transistor 52 through the R-C circuit consisting of a capacitor 56 and a resistor 57. The collector voltage is supplied from the battery 20.

As a result of the foregoing, the transistor 52 is driven "off" and its collector voltage through a collector resistor 58 increases. Thus, a positive going pulse is transmitted to the base of the transistor 51 through an R-C circuit consisting of a capacitor 59 and a resistor 61. This operation continues until a limiting state is reached, whereby the transistor 51 becomes saturated. The bistable multivibrator 45 maintains this state until a succeeding pulse is received from the astable multivibrator through a capacitor 73. After the succeeding pulse is received, the transistor 52 is turned "on," which results in the turning "off" of the transistor 51 in a manner similar to the operation just described. The above sequence is repeated by the succeeding pulse transmitted from the astable multivibrator 40 through the capacitor 73. Diodes 66–68 provide steering for the transistors 51 and 52 from the pulses received through the capacitor 73 so that appropriate application of the synchronous pulses may be obtained.

When the transistor 51 conducts, a signal is produced across an emitter load resistor 62 causing the transistor 36 of the solid state switch 30 to conduct. Likewise, the conduction of the transistor 52 produces a signal across an emitter load resistor 63 for causing the transistor 31 of the solid state switch 30 to conduct. The bistable multivibrator 45 is operated at a minimum power level for the transistors employed, but with sufficient current to saturate the transistors 31 and 36 and minimize any switching errors.

The free-running or astable multivibrator 40 comprises a transistor 70, which has its collector electrodes connected to the thermistor 25 and the reference resistor 37 through a capacitor 71. The emitter electrode of the transistor 70 is connected to ground and the collector electrode of the transistor 70 is connected to the positive side of the battery 20 through a resistor 72. The capacitor 73 connects the resistor 72 and the collector electrode of the transistor 70 to the common junction of the diodes 66–68.

When a signal is produced either across the reference resistor 37 or the thermistor 25 of the solid state switch 39 (FIG. 3), a current flow is established to charge the capacitor 71 through the collector resistor 72 to a predetermined potential. When the capacitor 71 is charged to the predetermined potential level, the transistor 75 starts to conduct. At soon as the transistor 75 starts to conduct, a positive going signal is transmitted to the base of the transistor 70 through the resistance-capacitance network comprising the capacitor 76 and the resistors 77 and 78. Thereupon, the transistor 70 is turned "on" which complements the current flow through the transistor 75. This regenerative closed loop action causes a pulse to be produced across the collector load resistor 79 of a fixed pulse width determined by the resistance-capacitance network comprising the capacitor 76 and the resistors 77 and 78. This action takes place continuously while the telemeter 10 is in operation.

As previously described, the transistors 31 and 36 of the switching circuits 26 and 35, respectively, conduct alternately. The resistance of the reference resistor 37 is a fixed value and the resistance of the thermistor 25 varies inversely with the body temperature of the animal in which the telemeter 10 is implanted. As a consequence thereof, a series of pulses will be produced across the collector load resistor 79 of equal pulse widths, but the successive periods between pulses will be determined by the resistance values of the resistor 37 and the thermistor 25. The time interval $T_1$ (FIG. 3) between pulses, which is related to the reference resistor 37, will be of a fixed period. The time interval $T_2$ (FIG. 3) between the succeeding pulses will vary inversely with the resistance of the thermistor 25.

The output pulses produced by the astable multivibrator 40 across the load resistor 79, in the exemplary embodiment, are of fifteen microsecond pulse widths and spaced apart 8–20 milliseconds depending upon the temperature being monitored, which in the exemplary embodiment is of the range 45 degrees C. to 30 degrees C. The successive pulse periods so produced are proportional to the ratio of the resistances of the thermistor 25 and the reference resistor 37. The ratio is used to compensate for variations in battery voltage and component values.

It is to be observed that the transistors 70 and 75 are "on" for a relative short time compared to their "off" time. Thus, the drive pulses for the oscillator 50, which are produced across the load resistor 79, are of relative short pulse width compared to the period between pulses. In this manner, power dissipation and requirements are held to a minimum.

Connected to the load resistor 79 of the astable multivibrator 40 is the input circuit of a suitable oscillator, such as the well-known Colpitts R.F. oscillator 50, which oscillates at a carrier frequency of 88–108 megacycles. The R.F. oscillator 50 comprises a transistor 80 with the base electrode thereof connected across the load resistor 79 through a resistor 81 and a capacitor 82. The emitter electrode of the transistor 80 is connected to ground through an emitter resistor 83.

The collector circuit for the transistor 80 is a tuned circuit comprising the R.F. coil 22 and serially connected capacitors 84 and 85 connected in parallel with the R.F. coil 22. The capacitors 84 and 85 also form a voltage divider network. A regenerative feedback network is connected at the junction between the capacitors 84 and 85 for applying a feedback signal across the emitter resistor 83. A capacitor 86 extends from the positive side of the battery 12 to ground.

The output signal produced by the oscillator 50 is a pulse time code modulated signal (FIG. 3), which is transmitted from the antenna of the telemeter 10, which antenna comprises the R.F. coil 22 and the ferrite core 21 surrounding the battery 20. By virtue of a pulse time code modulation, the data information transmitted by the telemeter 10 will not have the accuracy thereof degraded in any way, because the data information is not dependent upon frequency or amplitude variations in the R.F. transmission. The R.F. signal transmitted by the telemeter 10 allows the successive periods between pulses to be detected and recorded for ascertaining accurately the resistance of the thermistor 25 and thereby the body temperature of the animal in which the telemeter 10 is implanted.

In operation of the telemeter 10, the telemeter 10 is implanted in the body of an animal to ascertain the body temperature thereof. Thereupon, the transistors 51 and 52 of the bistable multivibrator 45 conduct alternately to produce pulses across the emitter load resistors 62 and 63, respectively. Hence, squarewave pulses are produced alternately across the emitter load resistors 62 and 63 while the telemeter 10 is in operation.

The signal produced across the emitter load resistor 62 causes the transistor 36 of the solid state switch 30 to conduct. The time period of the signal produced thereby for activating the astable multivibrator 40 depends upon the resistance of the reference resistor 37 and the capacitance of the capacitor 71. Since the reference resistor 37 is a fixed value, the time period of the signal produced in the output of the solid state switch 30 is a constant value (FIG. 3). On the other hand, the signal produced across the emitter load resistor 63 causes the transistor 31 of the solid state switch 30 to conduct. The time period of the pulse produced thereby for activating the astable multivibrator 40 depends upon the resistance of the thermistor 25 and the capacitance of the capacitor 71. The resistance of the thermistor 25 varies inversely with the body temperature of the animal in which the telemeter 10 is implanted. Therefore, the output waveform (FIG. 3) of the solid state switch 30 reflects a comparison or ratio between the fixed pulse time period $T_1$ defined by the reference resistor 37 and the capacitor 71 and the variable pulse time period $T_2$ defined by the thermistor 25 and the capacitor 71. The pulse periods $T_1$ occur alternately and the pulse periods $T_2$ are interposed therebetween so that there is a continuous and successive sequence of pulse periods $T_1$ and $T_2$.

Thus, the output of the astable multivibrator 40 (FIG. 3) produces a series of output pulses across the collector resistor 79 in which each pulse is of a fixed pulse width. The successive periods between the pulses, however, reflect alternately the value of the reference resistor 37 and the value of the resistance of the thermistor 25 with the period $T_1$ being a function of the resistor 37-capacitor 71 and with the period $T_2$ being a function of the thermistor 25-capacitor 71 (FIG. 3).

The output waveform of the astable multivibrator 40 is produced across the collector load resistor 79. The oscillator 50 oscillates in the range of 88–108 megacycles and is pulse modulated by the pulse signals produced across the load resistor 79 for transmitting from the antenna consisting of the R.F. coil 22 and the ferrite core 21 data information representing the body temperature of the animal in which the telemeter 10 is implanted.

In the exemplary embodiment of the electronic circuit of the present invention illustrated in FIG. 2, the components and the respective values thereof as employed herein are as follows:

| | |
|---|---|
| transistor 51—2N3129 | transistor 36—2N3129 |
| transistor 52—2N3129 | transistor 70—2N3129 |
| transistor 31—2N3129 | transistor 75—NS6065 |
| transistor 80—NS9715 | resistor 78—470K ohms |
| diode 66—1N4154 | resistor 79—150K ohms |
| diode 67—1N4154 | resistor 81—27K ohms |
| diode 68—1N4154 | resistor 83—220 ohms. |
| resistor 55—330K ohms | capacitor 56—220 pf. |
| resistor 57—470K ohms | capacitor 59—220 pf. |
| resistor 62—1 megohm | capacitor 71—5000 pf. |
| resistor 61—470K ohms | capacitor 73—220 pf. |
| resistor 63—1 megohm | capacitor 76—220 pf. |
| resistor 58—330K ohms | capacitor 82—100 pf. |
| resistor 37—2 megohms | capacitor 84—10 pf. |
| resistor 72—12K ohms | capacitor 85—47 pf. |
| resistor 77—68K ohms | |

Illustrated in FIG. 4 is an electronic circuit 100, which is a modification of the electronic circuit shown in FIG. 2. The electronic circuit 100 is contained in a package similar to the package 11 with the exception that a pressure sensing transducer 110 is implanted separately in the animal and is disposed outside of the package 11. Through this arrangement, the modified telemeter of the present invention is employed for transmitting data information on pressure or blood pressure of the animal in which the modified telemeter is implanted.

For this purpose, the electronic circuit 100 comprises a well-known pressure responsive transducer 110 which is in the form of a strain gauge pressure cell. A 5000 ohm strain gauge pressure cell manufactured by Microsystems, Type No. 1017, may be employed in the electronic circuit 100. In a well-known manner, variations in pressure on the strain gauge pressure transducer 110 will result in variations in the bridge resistance thereof to produce an unbalance. Hence, the bridge resistance unbalance of the strain gauge pressure transducer 110 varies with variations in pressure or blood pressure of the animal in which the telemeter and pressure sensing transducer 110 are implanted.

Applied across opposite bridge terminals of the pressure sensing transducer is a suitable source of potential which is supplied by the battery 20. In the exemplary embodiment, the potential of the battery 20 is 1.5 volts. Connected to opposite terminals of the pressure sensing transducer 110 intermediate the voltage supply terminals are the collector electrodes of switching transistors 115 and 116. If the bridge of the transducer 110 is balanced or a null condition is reached, equal voltage signals are applied to the collector electrodes of the transistors 115 and 116. Should proportionally greater pressures be applied to the transducer 110, then proportionally greater unbalances in resistance are produced in the bridge of the transducer 110 and proportionally greater differences in potential are applied to the collector electrode of the transistors 115 and 116.

For measuring pressure by detecting variations in the unbalance on the bridge of the transducer 110, a sampling of the bridge potentials of the transducer 110 is taken alternately and continuously from the terminals thereof connected to the collector electrodes of the transistors 115 and 116. This is accomplished by having the transistors 115 and 116 conduct alternately.

Connected to the transistor 115 through a resistor 121 is a transistor 122. Likewise, a transistor 123 is connected to the transistor 116 through a resistor 124. The transistors 115 and 122 will conduct simultaneously and the transistors 115 and 123 will conduct simultaneously.

A conventional bistable multivibrator 130 causes the transistors 122 and 123 to conduct alternately and thereby cause the switching transistors 115 and 116 to conduct alternately. The bistable multivibrator 130 comprises alternately conducting transistors 131 and 132. The emitter electrode of the transistor 131 is connected to the positive side of the battery 20 through an emitter load resistor 133 and the transistor 122. In a similar manner, the emitter electrode of the transistor 132 is connected to the positive side of the battery 20 through an emitter load resistor 134 and transistor 123.

The collector electrode of the transistor 131 is connected to the negative side of the battery 20 through a resistor 135. Similarly, the collector electrode of the transistor 132 is connected to the negative side of the battery 20 through a resistor 136. In the collector circuit of the transistor 131 are parallel connected capacitor 137 and resistor 138, which are connected to the base of the transistor 132. Likewise, parallel connected capacitor 139 and resistor 140 are in the collector circuit of the transistor 132 and are connected to the base electrode of the transistor 131. Steering diodes 141-143 interconnect the collector electrodes of the transistors 131 and 132.

Basically, the bistable multivibrator 130 operates in a manner previously described for the bistable multivibrator 45. The transistors 131 and 132 conduct alternately. When the transistor 131 is turning "on," its collector potential rises and a positive going potential is applied through the parallel connected capacitor 137 and resistor 138 to the base electrode of the transistor 132. As a result thereof, the transistor 132 is driven "off" and its collector voltage falls so that a negative going potential is applied to the base of the transistor 131 through the parallel connected capacitor 139 and resistor 140. The multivibrator circuit 130 maintains this state until a succeeding pulse is received from an astable mulivibrator 170 through a capacitor 183. At this time the transistor 132 is turned "on." A similar transition takes place when the transistor 132 is turned "on" for the turning "off" of the transistor 131. This sequence is repeated for succeeding synchronous pulses received through the capacitor 183 from the multivibrator 170.

Rectangular pulses are thereby produced alternately across the emitter load resistors 133 and 134. When a pulse appears across the load resistor 133, the transistor 122 conducts to cause the transistor 115 to conduct. In a similar manner, when a pulse appears across the load resistor 134, the transistor 123 conducts to cause the transistor 116 to conduct. Hence, the transistors 115 and 116 conduct alternately. The transistors 115 and 116 operate in the inverted mode.

Connected to the emitter electrodes of the transistors 115 and 116 is the base electrode of a transistor 144 of an A.C. amplifier 145. The transistor 144 has its collector electrode connected to the positive side of the battery 20 and its emitter electrode connected to the negative side of the battery 20 through an emitter load resistor 146. The A.C. amplifier 145 includes a transistor 150 that has its base electrode connected across the emitter load resistor 146 through a resistor 151 and a capacitor 152. The base electrode of the transistor 150 is connected to the negative side of the battery 20 through a capacitor 153. The collector electrode of the transistor 150 is connected to the positive side of the battery 20 through a collector resistor 154. The base electrode of the transistor 150 is tied to the collector electrode of the transistor 150 through a resistor 155.

A transistor 160 of the A.C. amplifier 145 has its base electrode connected to the collector electrode of the transistor 150 through a capacitor 161 and a resistor 162. A resistor 163 is in series with the resistor 162 and the junction therebetween is connected to the base electrode of the transistor 160. A collector resistor 164' is in the collector circuit of the transistor 160.

From the foregoing, it is to be observed that the transistors 115 and 116 conduct alternately. In the preferred embodiment, the rate of alternate conduction is in the vicinity of 1 kHz. When the transistor 115 conducts, it samples the potential on the bridge of the pressure strain gauge transducer 110 appearing on the terminal connected to its collector electrode. Likewise, when the transistor 116 conducts, it samples the potential on the bridge of the pressure strain gauge transducer 110 appearing on the terminal connected to its collector electrode. Thus, the strain gauge transducer is sampled at a frequency of approximately 1 kHz.

The signals alternately impressed on the collector electrodes of the transistors 115 and 116, respectively, are amplified by the A.C. amplifier 145. Therefore, the transistors 115 and 116 provide alternate signals from the bridge of the strain gauge transducer 110, which are amplified by the A.C. amplifier 145. The A.C. amplifier 145 amplifies static bridge voltage changes as well as dynamic signals. It should be noted that the strain gauge pressure transducer 110 normally operates with its bridge in an unbalance condition and, hence, the potential appearing on the collector electrode of the transistor 115 is different from the potential appearing on the collector electrode of the transistor 116. Of course, when the bridge is at a balance or at a null condition, the potential appearing on the collector electrode of the transistor 115 will be the same as a potential appearing on the collector electrode of the transistor 116.

The transistors 115 and 116 provide a low off-set voltage operated in the inverse mode. The A.C. amplifier 145 serves to amplify the signals sufficiently to obtain adequate modulation. In this regard, the A.C. amplifier 145 amplifies the low level signals of the transistors 115 and 116 and renders them suitable for use by the conventional astable multivibrator 170. The transistor 160 serves a constant current source for the astable multivibrator 170.

The astable multivibrator 170 comprises a transistor 171 having its base electrode connected to the output of the A.C. amplifier 145 and particularly the junction between the capacitor 161 and the resistor 162. The emitter electrode of the transistor 171 is connected to the positive side of the battery 20 through an emitter resistor 172. An R.F. by-pass capacitor 173 connects the base electrode of the transistor 171 to the negative side of the battery 20. A transistor 175 has its base electrode connected to the collector electrode of the transistor 171. The emitter electrode of the transistor 175 is connected to the negative side of the battery 20 and the collector electrode of the transistor 175 is connected to the positive side of the battery 20 through a resistor 176.

A transistor 180 has its base electrode connected to the collector electrode of the transistor 175 through an R-C network of serially connected capacitor 177 and resistor 178, which are connected in parallel with a resistor 179. A collector load resistor 181 connects the collector electrode of the transistor 180 to the negative side of the battery 20. The output signal produced by the astable multivibrator 170 appears across the collector load resistor 181. The transistors 175 and 180 conduct in a complementary manner. When the transistor 175 is "on," the transistor 180 is turned "on." A capacitor 182 is connected between the collector electrode of the transistor 171, the base electrode of the transistor 175 and the collector electrode of the transistor 180. The synchronous signal coupling capacitor 183 connects the base electrode of the transistor 175 through the capacitor 182 with the common junction between the steering diodes 141-143 of the collector circuits of the transistors 131 and 132 in the bistable multivibrator 130.

The operation of the astable multivibrator 170 is similar to the operation described for the astable multivibrator 40. The output signal of the A.C. amplifier 145 is converted into a pulse signal through the astable multivibrator 170. The greater the magnitude of the output signal of the A.C. amplifier 145, the greater the input pulse width signal fed to the astable multivibrator 170.

When a signal is produced across the resistors 162 and 163, the constant current transistor 171 has the signal applied to the base thereof varied to vary the current flow therethrough with the result that when the potential applied to the base electrode of the transistor 175 reaches a predetermined level, the transistor 175 is turned "on." As a consequence thereof, the transistor 180 is turned "on." The transistors 180 and 175 are turned "on" for a predetermined time duration defined by the resistance-capacitance network comprising the capacitor 177 and the resistors 178 and 179. Thus, each pulse produced across the load resistor 181 of the astable multivibrator 170 has a pulse width of a fixed period.

Each input signal fed to the astable multivibrator 170 will turn "on" the transistor 175 thereby turning "on" the transistor 180. As a consequence thereof, the successive periods between pulses produced across the load resistor 181 for the astable multivibrator 170 will vary in accordance with the respective time periods of the pulses produced by the A.C. amplifier 145.

Therefore, the transistors 115 and 116 alternately sample the bridge potentials on opposite terminals respectively of the pressure strain gauge transducer 110 at the rate of 1 kHz. The transistors 115 and 116 transmit alternately and respectively signals to the A.C. amplifier 145 commensurate with the potentials sampled. The A.C. amplifier 145 thereupon transmits in succession the signals received alternately from the transistors 115 and 116 to the astable multivibrator 170, where the amplified signals are converted into pulse time period signals. The astable multivibrator 170 receives the pulse time period signals from the A.C. amplifier 145 and produces successive pulse signals across the load resistor 181 of equal pulse widths but with the periods between pulses varying in accordance with the potentials sampled by the alternately conducting transistors 115 and 116.

Since the voltage seen by the transistor 115 controls one period and the voltage seen by the transistor 116 controls the succeeding period, an electrical balance or null for the bridge of the pressure strain gauge transducer 110 will produce signals of the same magnitude and successive pulse periods will be equal. The amount of unbalance detected by the transistors 115 and 116 from the bridge of the pressure strain gauge transducer 110 or the variation in successive periods between pulses is a function of the pressure or the blood pressure of the animal in which the telemeter is implanted. Thus, the difference between successive pulse periods is proportional to the static bridge unbalance as well as the dynamic unbalance of the pressure strain gauge transducer 110 and, hence, the pressure of the body of the animal in which the telemeter is implanted.

Connected to the load resistor 181 of the astable multivibrator 170 is the input circuit of a suitable oscillator, such as a well-known Colpitts R.F. oscillator 190. The R.F. oscillator 190 is similar to the previously described oscillator 50 and operates in a similar manner. The R.F. oscillator 190 comprises a transistor 191 with the base electrode thereof connected across the load resistor 181 through a resistor 192 and a capacitor 193. The emitter electrode of the transistor 191 is connected to ground through an emitter resistor 194.

The collector circuit for the transistor 191 is a tuned circuit comprising the R.F. coil 22 and serially connected capacitors 195 and 196 connected in parallel with the R.F. coil 22. The capacitors 195 and 196 also form a voltage divider network. A regenerative feedback network is connected at the junction between the capacitors 195 and 196 for applying a feedback signal across the emitter resistor 194. A capacitor 197 extends from the positive side of the battery 20 to ground.

The output signal produced by the oscillator 190 is a pulse time code modulated signal, which is transmitted from the antenna of the telemeter, which antenna comprises the R.F. coil 22 and the ferrite core 21 surrounding the battery 20.

In the operation of the telemeter for transmitting pressure information data, the telemeter is implanted in the body of an animal to ascertain the blood pressure thereof. Thereupon, the bistable multivibrator 130 causes the switching transistors 115 and 116 to conduct alternately. As a consequence thereof, the transistors 115 and 116 sample alternately the potentials from opposite terminals of the bridge of the pressure strain gauge transducer 110 and transmit alternately and respectively signals commensurate in magnitude to the sampled potentials.

Such signals are amplified by the A.C. amplifier 145. The amplified signals are converted into pulse time period signals by the A.C. amplifier 145. These pulse signals are fed to the astable multivibrator 170, which produces successive pulse signals across the load resistor 181 having the same pulse width but with successive periods between pulses commensurate with the pulse time periods of the signals produced by the A.C. amplifier 145.

The pulse signals produced across the load resistor 181 modulate the oscillator 50 to produce pulse code modulated signals. The pulse code modulated signals are transmitted through the antenna consisting of the R.F. coil 22 and the ferrite core 21. Such pulse code modulated signals are data information representing the blood pressure of the animal in which the telemeter is implanted. The difference between successive pulse periods is proportional to the static bridge unbalance of the pressure strain gauge transducer 110 and the dynamic unbalance and, hence, the pressure of the body in which the telemeter is implanted. Since the information data is derived from the successive time periods between pulses, amplitude and frequency changes in the transmission do not affect the accuracy of the received data.

In the exemplary embodiment of the electronic circuit illustrated in FIG. 4 the components and the respective values thereof as employed herein are as follows:

| | |
|---|---|
| transistor 122—NS6065 | diode 142—1N4154 |
| transistor 115—2N3129 | diode 143—1N4154 |
| transistor 131—NS6065 | capacitor 137—220 pf. |
| transistor 132—NS6065 | capacitor 139—220 pf. |
| transistor 116—2N3129 | capacitor 153—100 pf. |
| transistor 123—NS6065 | capacitor 173—100 pf. |
| transistor 144—2N3129 | capacitor 182—1000 pf. |
| transistor 150—2N3129 | capacitor 183—100 pf. |
| transistor 160—NS6065 | capacitor 177—220 pf. |
| transistor 171—NS6065 | capacitor 193—100 pf. |
| transistor 175—2N3129 | capacitor 195—47 pf. |
| transistor 180—NS6065 | capacitor 196—10 pf. |
| transistor 191—2N709 | capacitor 197—240 pf. |
| diode 141—1N4154 | resistor 121—270K ohms |
| resistor 133—1 megohm | resistor 154—270K ohms |
| resistor 135—330K ohms | resistor 164—68K ohms |
| resistor 138—470K ohms | resistor 162—270K ohms |
| resistor 140—470K ohms | resistor 163—820K ohms |
| resistor 134—1 megohm | resistor 172—68K ohms |
| resistor 136—330K ohms | resistor 176—150K ohms |
| resistor 124—270K ohms | resistor 179—470K ohms |
| resistor 146—330K ohms | resistor 178—47K ohms |
| resistor 151—150K ohms | resistor 181—12K ohms |
| resistor 155—2 megohms | resistor 194—220 ohms |

It is to be understood that modifications and variations of the embodiments of the invention disclosed herein may be resorted to without departing from the spirit of the invention.

Having thus described my invention, what I claim as new and desire to protect by Letters Patent is:

1. Apparatus for monitoring a condition comprising means for generating first and second voltages, the ratio of said voltages being a function of said condition, switching means for alternately sampling said voltages, means coupled to said switching means for generating pulses having equal width and a repetition rate which is a function of the amplitude of said sampled voltages, whereby said pulses form a train having alternate intervals $T_1$ and $T_2$ therebetween, the ratio of said $T_1$ to $T_2$ being equal to the ratio of said first voltage to said second voltage.

2. Apparatus for telemetering a condition comprising means for producing first and second voltages, the ratio of said first and second voltages being proportional to said condition, means for alternately sampling said first and second voltages and generating a pulse train having pulses of equal width and alternate intervals $T_1$ and $T_2$ therebetween, said ratio of $T_1$ to $T_2$ being the same as the ratio of said first voltage to said second voltage, and an R-F generator coupled to said pulse generating means, said pulses modulating said R-F generator.

3. Apparatus for telemetering a condition comprising means for generating first and second voltages, the ratio of said voltages being a function of said condition, means for alternately sampling said voltages, pulse generating means coupled to said sampling means for producing a pulse train, said pulse train having pulses of equal width and alternate intervals $T_1$ and $T_2$ therebetween, the ratio of said $T_1$ to said $T_2$ being identical to the ratio of said first voltage to said second voltage, and means coupled to said pulse generating means for generating a burst of R-F energy for each pulse.

4. Apparatus for telemetering a condition comprising means for generating first and second voltages, the ratio of said voltages being a function of said condition, switching means for alternately sampling said voltages, pulse generating means coupled to said sampling means for producing a pulse train, said pulse train having pulses of equal width and alternate intervals $T_1$ and $T_2$ therebetween, the ratio of said $T_1$ and said $T_2$ being identical to the ratio of said first voltage to said second voltage, an R-F generator coupled to said pulse generating means, said generator being on during the duration of said pulses, said generator comprising a resonant circuit having a coil wound on a ferrite core, said coil and said core operating as an antenna.

5. A biomedical telemeter for implanting in animals and monitoring a condition comprising a condition-sensitive transducer, an R-F generator, means coupled to said transducer and said generator for modulating said generator in conformance with said condition, a battery for supplying energy to said generator and said modulating means, said generator comprising a resonant circuit having a coil wound around a ferrite core, said coil and said core operating as an antenna, said battery being located within said core, a moisture-resistant coating about said coil, core and battery, and a package for jointly sealing said transducer, modulating means and all of said generator except said coil and core.

6. A biomedical telemeter for implanting in animals and monitoring a condition comprising a condition-sensitive trasducer, an R-F generator, means coupled to said transducer and said generator for modulating said generator, said generator producing equal-duration bursts of R-F energy with alternate periods $T_1$ and $T_2$ between said bursts, the ratio of said $T_1$ to said $T_2$ being a function of said condition, a battery for supplying energy to said generator and said modulating means, said generator comprising a resonant circuit having a coil wound around a ferrite core, said coil and said core operating as an antenna, said battery being located within said core, a moisture-resistant coating about said coil, core and battery, and a package for jointly sealing said transducer, modulating means and all of said generator except said coil and core.

7. A temperature telemeter comprising a bistable multivibrator, an astable multibrator for generating output pulses of equal width and varying repetition rate, an R-F generator, said astable multivibrator having a first output coupled to said bistable multivibrator and a second output coupled to said R-F generator, said output pulses from said astable multivibrator causing said bistable multivibrator and said R-F generator to switch states and turn on, respectively, said astable multivibrator having first and second pulse-repetition rate controlling circuits, said first circuit having a temperature-sensitive resistor, said second circuit having a reference resistor, switching means controlled by said bistable multivibrator for alternately connecting said first and second circuits into said astable multivibrator, whereby said output pulses from said astable multivibrator have alternate intervals $T_1$ and $T_2$ therebetween, said period $T_1$ being proportional to the resistance of said temperature-sensitive resistor, and said period $T_2$ being proportional to the resistance of said reference resistor.

8. A temperature telemeter comprising a bistable multivibrator having two outputs and an input, an astable multivibrator for generating pulses of equal width and varying pulse repetition rate, an R-F generator, said astable multivibrator having first and second outputs, said first output being coupled to said input of said bistable multivibrator, said second output being coupled to said R-F generator, said output pulses from said astable multivibrator causing said bistable multivibrator and said R-F generator to change states and turn on, respectively, said astable multivibrator having first and second R-C circuits for establishing pulse repetition rates, said first R-C circuit having a temperature-sensitive resistor and a switch connected in series, said second R-C circuit having a reference resistor and a switch connected in series, said first and second circuits having a common capacitor, said outputs of said bistable multivibrator being coupled to said switches, respectively, whereby said switches are alternately closed and said R-C circuits are alternately energized, said output pulses from said astable multivibrator having alternate intervals of $T_1$ and $T_2$ therebetween, said interval $T_1$ being proportional to the resistance of said temperature-sensitive resistor, and said interval $T_2$ being proportional to the resistance of said reference resistor.

9. A telemeter for monitoring pressure comprising a transducer for generating first and second voltages, the ratio of said voltages being a function of said pressure, switching means for alternately sampling said voltages, an astable multivibrator for generating pulses of equal width and varying repetition rate, said multivibrator having a capacitor, modulating means coupled to said capacitor for controlling the current therethrough in response to said sampled voltage, pulse initiation in said multivibrator being a function of the charge in said capacitor, means for coupling said switching means to said modulating means, said pulse train from said multivibrator having alternate intervals $T_1$ and $T_2$ therebetween, the ratio of said $T_1$ to said $T_2$ being equal to the ratio of said first voltage to said second voltage, an R-F generator coupled to said multivibrator, said generator being on during the duration of said multivibrator pulses.

10. A pressure telemeter comprising a bistable multivibrator, said bistable multivibrator having first and second outputs and an input, a pressure-sensitive bridge circuit having first, second, third and fourth terminals, a D-C power source connected to said first and third terminals, an amplifier having an input and an output, first and second switches, said first switch being responsive to said first multivibrator output to connect said second terminal to said amplifier input, said second switch being coupled to said second multivibrator output, said fourth terminal to said amplifier input, an astable multivibrator having an input and first and second outputs, an R-F generator, said output of said amplifier being coupled to said input of said astable multivibrator, said first output of said astable multivibrator being coupled to said input of said bistable multivibrator and said second output of said astable multivibrator being coupled to said R-F generator.

References Cited

UNITED STATES PATENTS

| | | | |
|---|---|---|---|
| 2,932,027 | 4/1960 | Crowley | 343—788 |
| 3,366,881 | 1/1968 | Malone et al. | 340—206 XR |
| 2,411,130 | 11/1946 | Evans | 325—143 |

(Other references on following page)

UNITED STATES PATENTS

| | | | |
|---|---|---|---|
| 2,418,268 | 4/1947 | Lawson | 332—14 |
| 2,468,703 | 4/1949 | Hammel. | |
| 2,542,700 | 2/1951 | Peterson | 325—143 XR |
| 3,065,636 | 11/1962 | Pfann. | |
| 3,158,027 | 11/1964 | Kibler. | |
| 3,162,857 | 12/1964 | Sanders | 325—143 XR |
| 3,210,747 | 10/1965 | Clynes | 340—206 |
| 3,260,107 | 7/1966 | Rosen. | |
| 3,274,588 | 9/1966 | Brown | 325—111 XR |
| 3,308,667 | 3/1967 | Pearlman. | |
| 3,333,476 | 8/1967 | Hardy et al. | |

LOUIS R. PRINCE, *Primary Examiner.*

F. SHOON, *Assistant Examiner.*

U.S. Cl. X.R.

73—362; 340—206